US008473513B2

(12) United States Patent
Agarwal et al.

(10) Patent No.: US 8,473,513 B2
(45) Date of Patent: Jun. 25, 2013

(54) EFFICIENT MULTIPLE TUPLE GENERATION OVER STREAMING XML DATA

(75) Inventors: Manoj K. Agarwal, Noida (IN); Manish A. Bhide, New Delhi (IN); Srinivas K. Mittapalli, Secunderabad (IN); Mukesh K. Mohania, Agra (IN); Sriram K. Padmanabhan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 12/697,297

(22) Filed: Jan. 31, 2010

(65) Prior Publication Data

US 2011/0191323 A1    Aug. 4, 2011

(51) Int. Cl.
  *G06F 7/00* (2006.01)
  *G06F 17/30* (2006.01)
(52) U.S. Cl.
  USPC ............................ 707/778; 707/802; 707/692
(58) Field of Classification Search
  USPC .......................................... 707/778, 802, 692
  See application file for complete search history.

(56) References Cited

U.S. PATENT DOCUMENTS

| | | | |
|---|---|---|---|
| 7,392,239 B2 | 6/2008 | Fontoura et al. | |
| 7,933,928 B2* | 4/2011 | Chandrasekar et al. | 707/802 |
| 2004/0002973 A1* | 1/2004 | Chaudhuri et al. | 707/7 |
| 2004/0205082 A1* | 10/2004 | Fontoura et al. | 707/101 |
| 2006/0053122 A1* | 3/2006 | Korn et al. | 707/100 |
| 2007/0174231 A1* | 7/2007 | Hernandez-Sherrington et al. | 707/2 |
| 2008/0243904 A1* | 10/2008 | Fan | 707/102 |
| 2009/0006314 A1* | 1/2009 | Balmin et al. | 707/2 |
| 2009/0024753 A1* | 1/2009 | Mammen | 709/231 |
| 2009/0043736 A1 | 2/2009 | Han et al. | |
| 2009/0150339 A1* | 6/2009 | Bruno et al. | 707/2 |
| 2009/0307187 A1* | 12/2009 | Averbuch et al. | 707/2 |

FOREIGN PATENT DOCUMENTS

WO    WO 2009/035871    3/2009

OTHER PUBLICATIONS

Lijun Chang, Query Ranking in Probabilistic XML data, pp. 1-12, 2009.*
Nicolas Bruno, Holistic Twig Joins: Optimal XML Pattern Matching, p. 1,. 2009.*
Zhang, Bin; Feiyue, Ye, "Semantics Based Multi-XML Query Algorithm", 2008 International Conference on Computer Science and Software Engineering.
Huo, Huan; Zhou, Rui; Wang, Guoren; Hui, Xiaoyun; Xiao, Chuan; Yu, Yongqian, "Efficient Evaluation of Multiple Queries on Streamed XML Fragments", Institute of Computer System, Northeastern University, Shenyang, China.
Kim, S. W.; Lee, J; Lim, H.C., "Efficient Indexing and Querying XML Data Using Element Type in a Dynamic Environment", Science Links Japan, Journal IEICE Trans Fundam Electron Commun Comput Sci, vol. E87-A, No. 6, pp. 1472-1478 (2004).
Li, Xiaogang, "Efficient Evaluation of XQuery over Streaming Data", The Ohio State University.
Wei, Mingzhu; Li, Ming; Runderensteiner, Elke A.; Mani, Murali, "Processing Recursive XQuery over XML Streams: The Raindrop Approach", Proceedings of the 22nd International Conference on Data Engineering Workshops.

* cited by examiner

*Primary Examiner* — Cam Truong
(74) *Attorney, Agent, or Firm* — Ference & Associates LLC

(57) ABSTRACT

Methods and arrangements for extracting tuples from a streaming XML document. A query twig is applied to the XML document stream, tuples are extracted from the XML document stream based on the query twig, and a quantity of extracted tuples is limited via foregoing extraction of duplicate tuples extraction of tuples that do not satisfy query twig criteria.

19 Claims, 14 Drawing Sheets

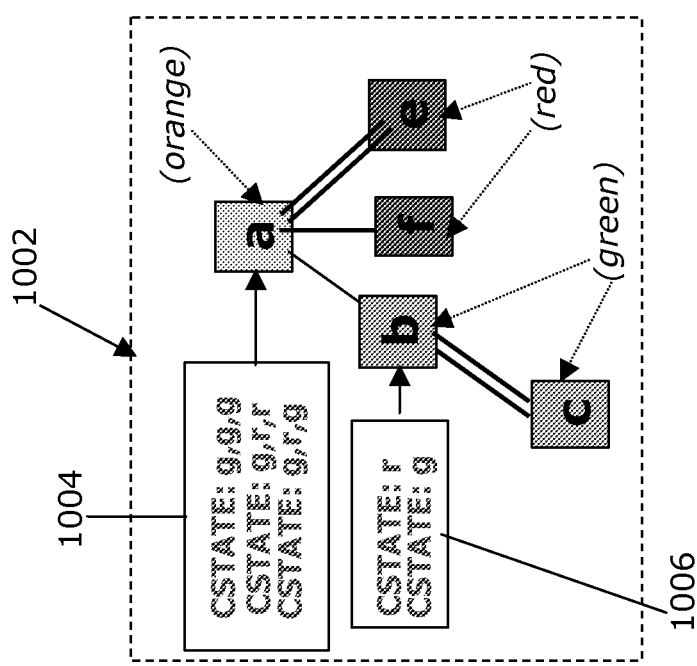
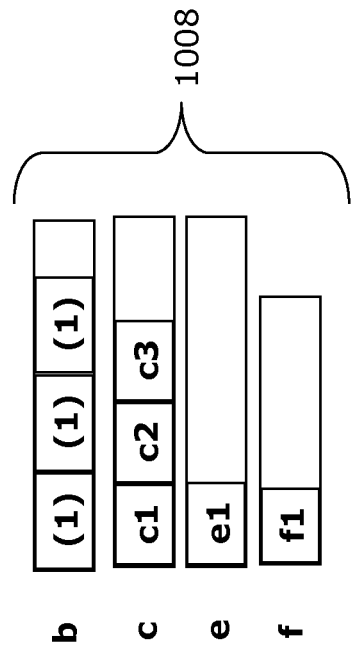
FIG. 10a
FIG. 10b

EFFICIENT MULTIPLE TUPLE GENERATION OVER STREAMING XML DATA

BACKGROUND

Generally, XML (extensible markup language) has become an important standard for data exchange. The exchange or transmission of large XML streams has become increasingly common, and often the preference is to consume such streams "on the fly", as opposed to storing them for future use.

One of the core operations of such consumption processes of XML streams is tuple extraction. Generally, tuple extraction lies at the core of XML data integration. One of the most common ways to retrieve information from XML is to "shred" them in relational format. Once shredded, queries can be applied to present an aggregate view for BI (business intelligence). Another important application related to XML streams is for data transformation in schema mapping.

Surprisingly, tuple extraction over streams has not hitherto been widely addressed. Thus, there have been few if any sub-optimal algorithms presented for extracting single tuple types over XML streams. Further, little if any work has been done in the area of extracting multiple tuple types by way of optimal algorithms.

BRIEF SUMMARY

In summary, one aspect of the invention provides an apparatus comprising: one or more processors; and a computer readable storage medium having computer readable program code embodied therewith and executable by the one or more processors, the computer readable program code comprising: computer readable program code configured to accept an XML document stream; computer readable program code for applying a query twig to the XML document stream; computer readable program code for extracting tuples from the XML document stream based on the query twig; computer readable program code for limiting a quantity of extracted tuples via foregoing: extraction of duplicate tuples; and extraction of tuples that do not satisfy query twig criteria.

Another aspect of the invention provides a method comprising: accepting an XML document stream; applying a query twig to the XML document stream; extracting tuples from the XML document stream based on the query twig; limiting a quantity of extracted tuples via foregoing: extraction of duplicate tuples; and extraction of tuples that do not satisfy query twig criteria.

A further aspect of the invention provides a computer program product comprising: a computer readable storage medium having computer readable program code embodied therewith, the computer readable program code comprising: computer readable program code configured to accept an XML document stream; computer readable program code for applying a query twig to the XML document stream; computer readable program code for extracting tuples from the XML document stream based on the query twig; computer readable program code for limiting a quantity of extracted tuples via foregoing: extraction of duplicate tuples; and extraction of tuples that do not satisfy query twig criteria.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 10a schematically illustrates the Qnode tree of FIG. 9b in an evolved state.

FIG. 10b schematically illustrates a table of CPAIRS for the sample algorithm run.

FIG. 14b schematically illustrates CPAIRS for one Qnode in the process run of FIG. 14a.

DETAILED DESCRIPTION

Figure 1:
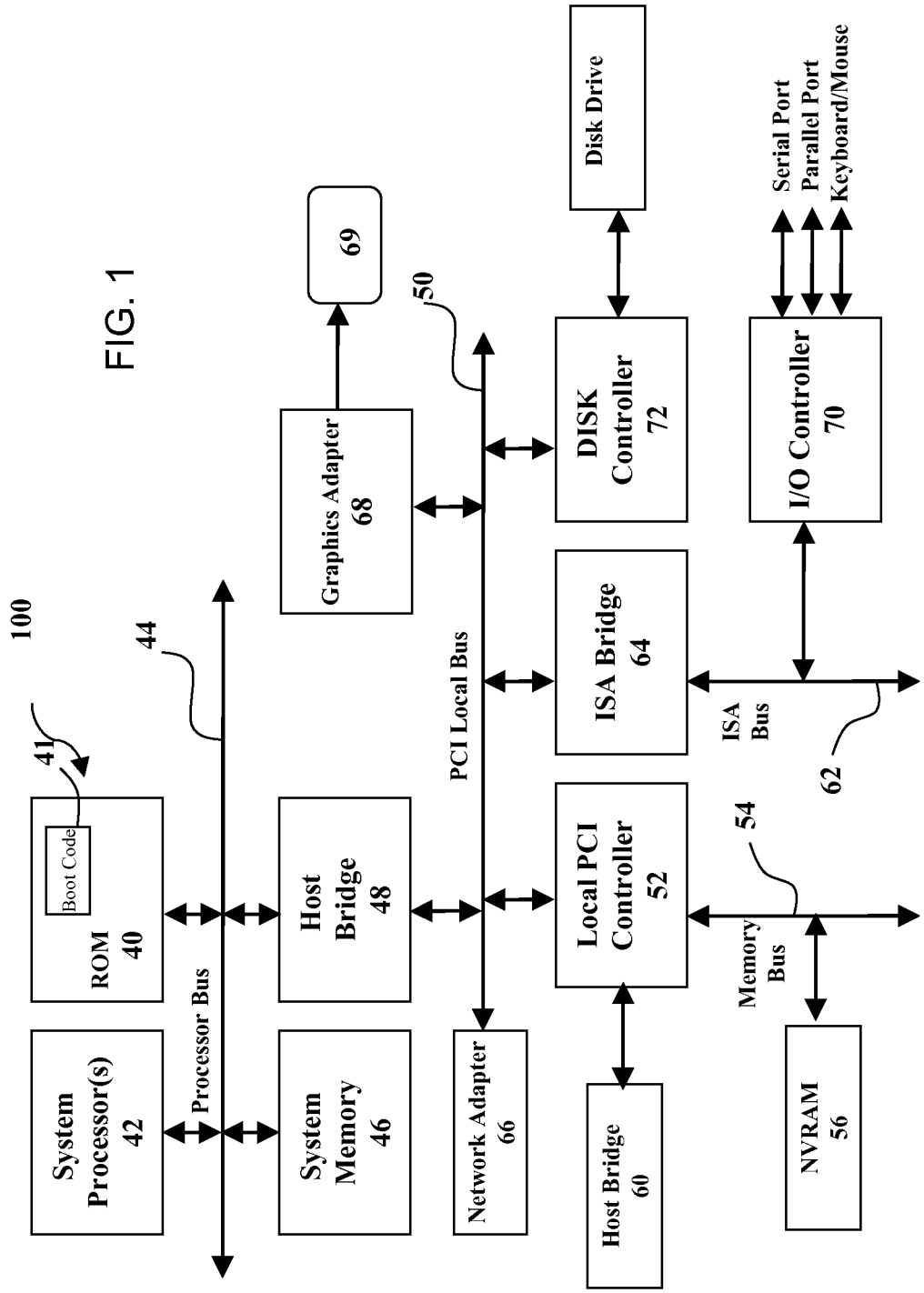
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is depicted a block diagram of an illustrative embodiment of a computer system 100. The illustrative embodiment depicted in FIG. 1 may be an electronic device such as a laptop or desktop personal computer, a mobile/smart phone or the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

In accordance with at least one presently preferred embodiment of the present invention, a problem is addressed wherein the input is represented by a stream of an XML document. No schema information may typically be provided other than the set of XPaths corresponding to extraction nodes. The output sought may typically be tuples corresponding to the input XPaths.

Conventional algorithms typically are restricted to disk-based shredding algorithms for streaming XML, leading to unacceptably high I/O and high processing times.

Figure 2:
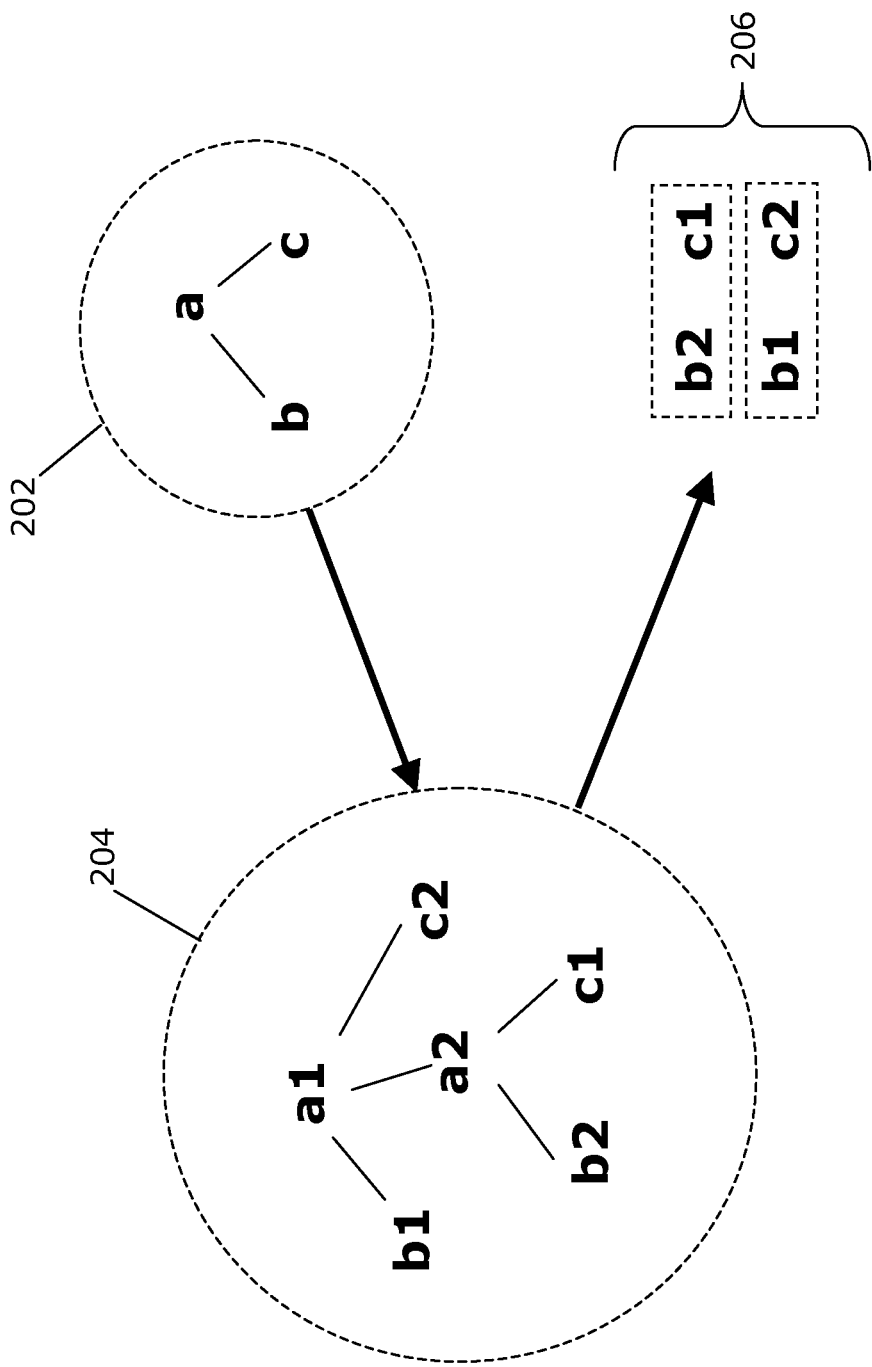
FIG. 2-4 schematically illustrate various processes of tuple extraction.
Figure 3:
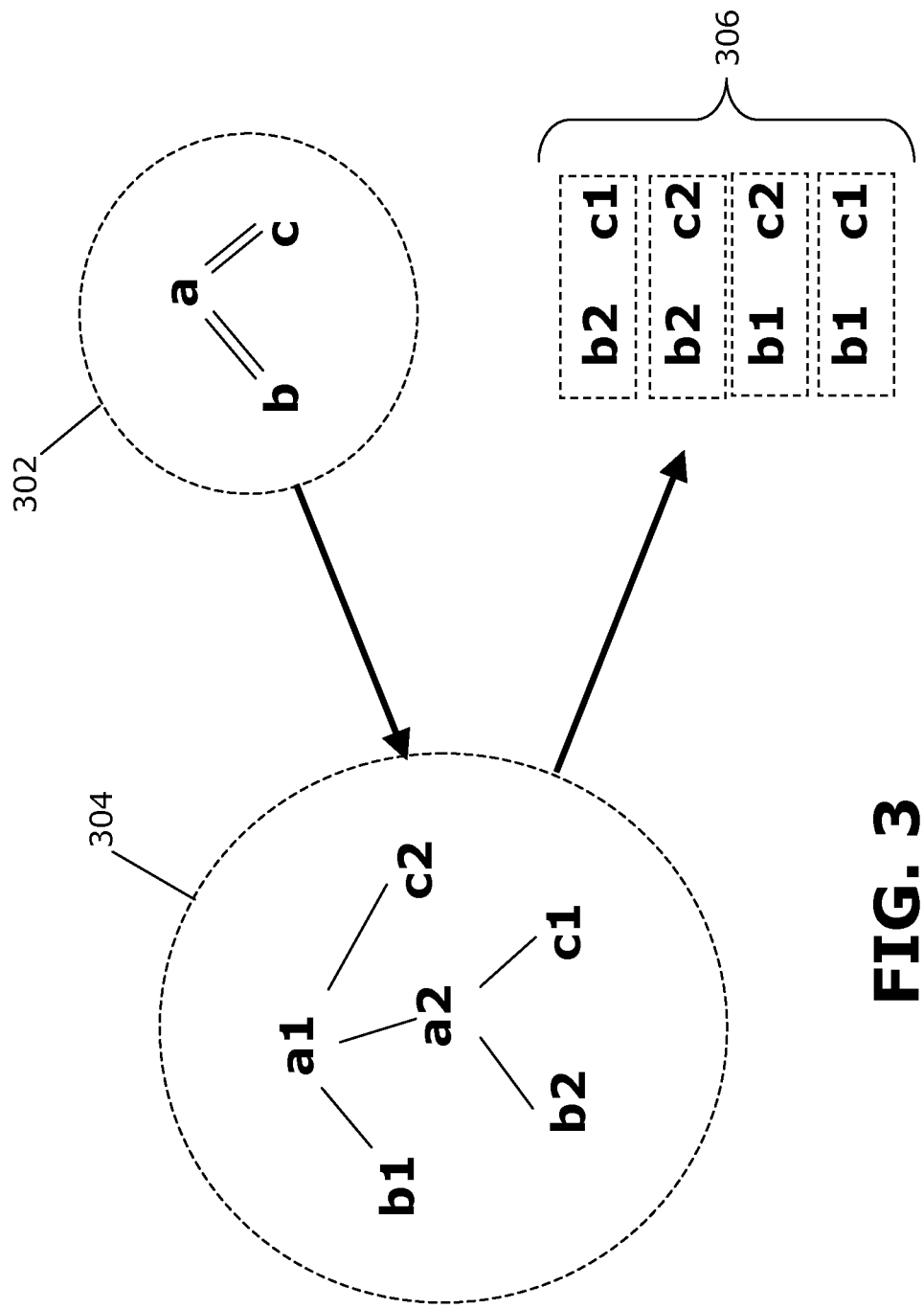
Figure 4:
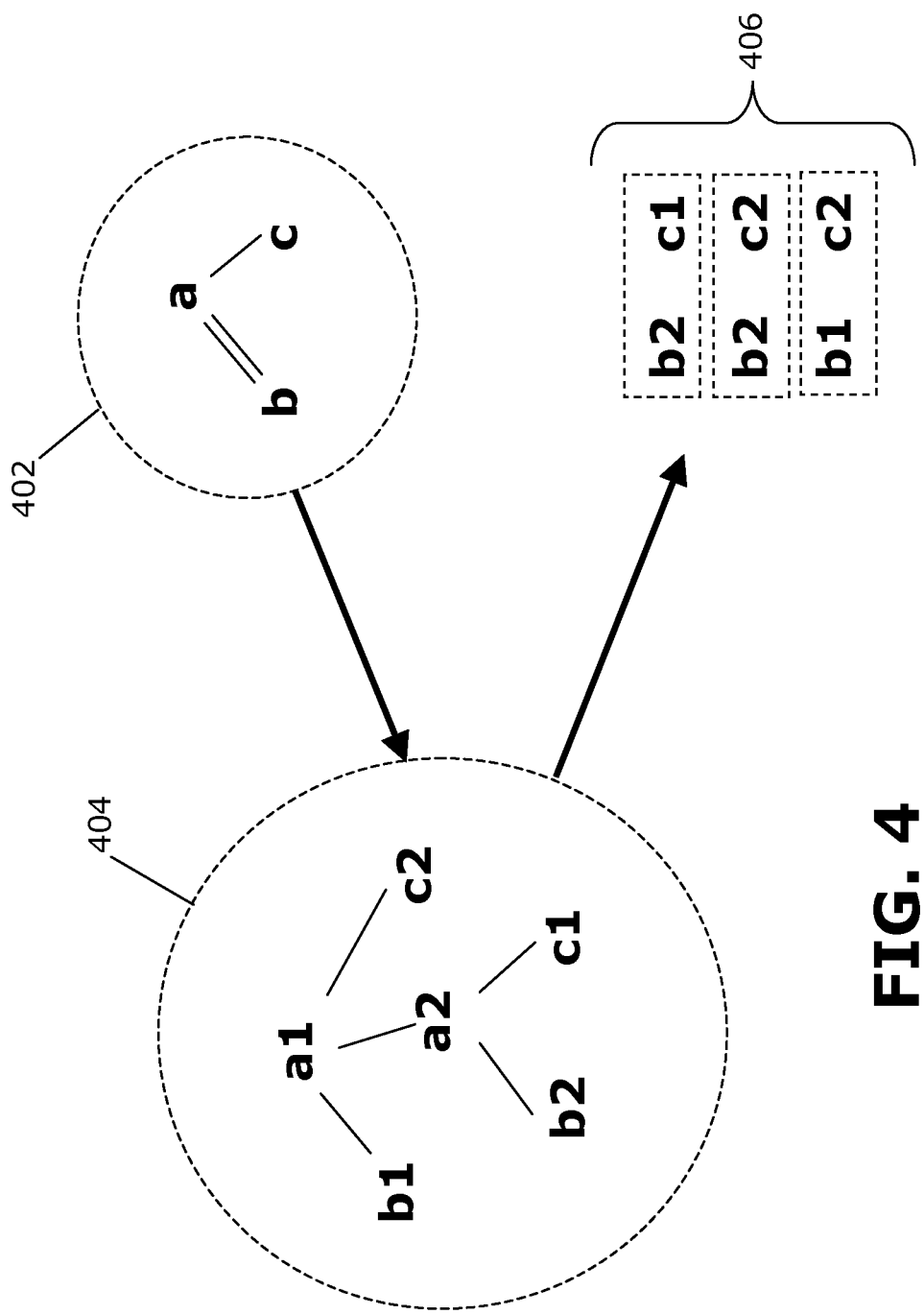

FIGS. 2-4 each illustrate, for background purposes, contexts of tuple extraction processes of increasing complexity. It will be appreciated from the discussion herebelow that conventional arrangements present hindrances with cases of increasing complexity, a problem that embodiments of the invention readily overcome. The processes involved in FIGS. 2-4 may of course be run on essentially any suitable computer system, such as that indicated at 100 in FIG. 1.

FIG. 2 schematically illustrates a simple process of tuple extraction with relatively uncomplicated parameters. Particularly, a simple query twig 202 may be applied to XML document stream 204 (shown in "tree" format) to yield the pair of extracted tuples indicated at 204. The edges between nodes a/b/c in twig 202 are shown as a single line and thus may be considered "parent-child" edges in the present discussion. Accordingly, the query twig 202 seeks to yield tuples where for any given "a" node in XML document 204, a parent-child relationship exists between such a node and both a "b" node and a "c" node. The yielded tuples 206, as shown, are (b2, c1) and (b1, c2), which can easily be divined via reference to XML document 204.

FIG. 3 schematically illustrates a process similar to that of FIG. 2, except here a query twig 302 shows double lines which, in the present discussion, may be considered "ancestor-descendant" edges. This has the effect of yielding nodes with the indicated relationship where a node is any "descendant" in the tree of document 304. Accordingly, the query twig 302 seeks to yield tuples where for any given "a" node in XML document 304, any ancestor-descendant relationship (e.g., parent-child, "grandparent-grandchild", etc.) exists between such a node and both a "b" node and a "c" node. The yielded tuples 306, as shown, are (b2, c1), (b2, c2), (b1, c2) and (b1, c1), which can easily be divined via reference to XML document 304.

Inasmuch as even FIG. 3 presents a relatively straightforward case where ascertaining the queried relationships is simple, albeit yielding more results than in the case of FIG. 2, FIG. 4 schematically illustrates a process of greater complexity. Here, query twig 402 seeks a an ancestor-descendant relationship between any "a" and any "b" but solely a parent-child relationship between any "a" and any "c". Applying this to XML document 404 ultimately yields three tuples (406) as shown, which again can easily be divined via reference to XML document 404. However, a considerable problem in conventional arrangements has been that the final result of three tuples (406) in this example will have come about only from actually generating four tuples and then casting out the one (in this case, [b1, c1]) that does not fit query twig 402. Particularly, conventional arrangements will initially treat a "mixed" query (such as that of twig 402) as one where all edges will initially be treated as ancestor-descendant edges, with non-conformant tuples then being discarded retroactively.

It can thus be appreciated that, on a larger scale, it is possible in conventional arrangements to over-generate tuples to the extent of yielding far more than actually would end up in a result, tying up computer time and resources (if indeed such resources are even capable of handling such a large computation). Embodiments of the invention, thus, can distinguish over conventional processes by foregoing and obviating an initial step of over-generating a large number of tuples that would subsequently be discarded; instead, embodiments of the invention seek to generate directly solely the number and scale of tuples that are necessary to satisfy a given query.

Figure 5:
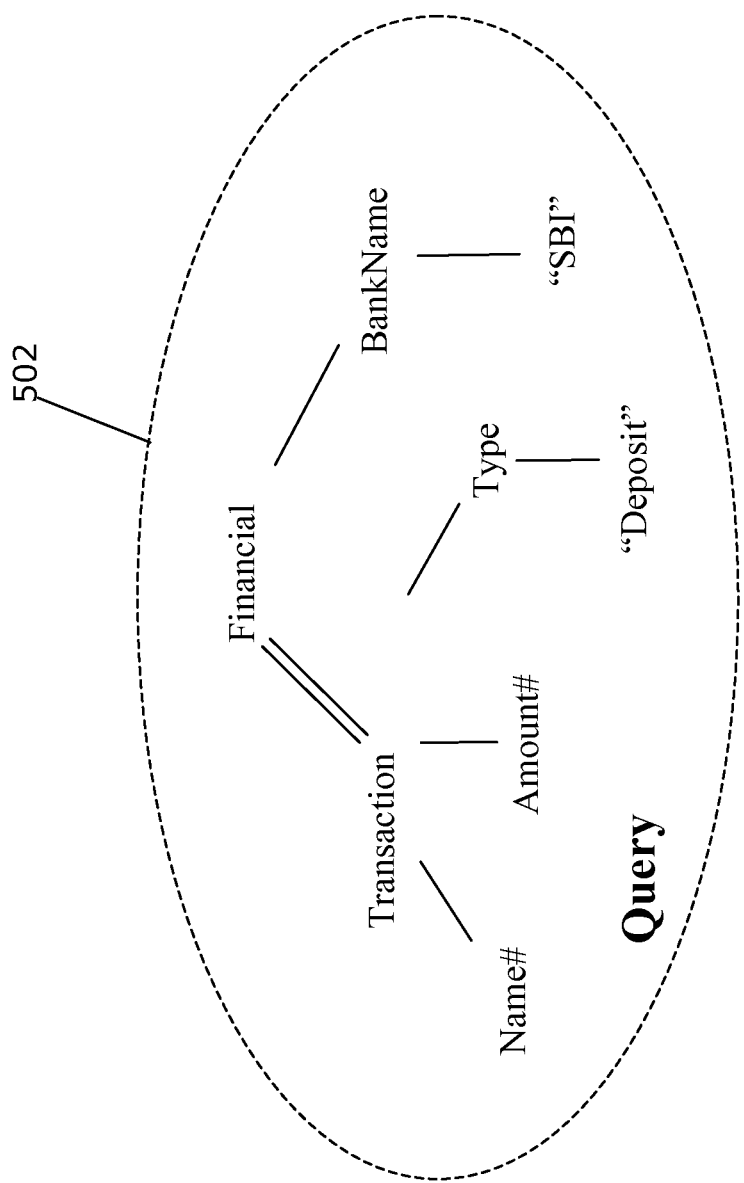
FIG. 5 schematically illustrates a large and complex XML document.

FIG. 5, for its part, schematically illustrates a large and complex XML document 502 as may be employed in banking transactions; note the parent-child edges between all nodes, except for the ancestor-descendant edge between "Financial" and "Transaction". Considering that millions of transactions, and thus data inputs, may be possible, the potential for significant memory overrun is considerable. More to the point, conventional processes in the context of a document such as 502 will cache data in memory until the "BankName" node appears in the stream. Typical constraints on memory will ensure that this does not happen until millions of transactions (via the "Transaction" node) have already been assimilated into memory.

In contrast, and as will be further appreciated herebelow, embodiments of the invention permit the transfer of partially computed results to disk and can produce output whenever a "blocking node" arrives or is detected. In other words, once a partial stream is moved into memory, this can be returned as directly computed output with no further processing required for producing the desired results. Accordingly, embodiments of the invention provide for the efficient computation and output of results from XML document streams wherein such streams produce data too large to fit into memory.

Figure 6:
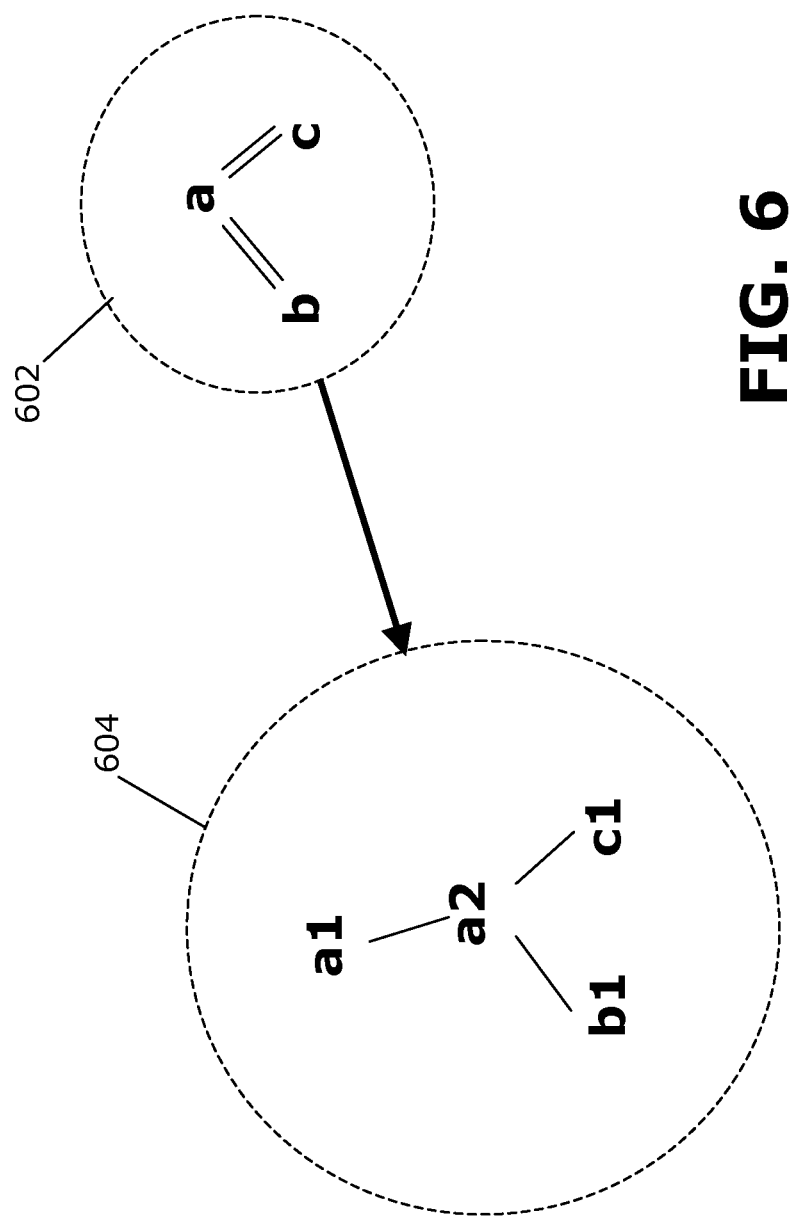
FIG. 6 schematically illustrates another process involving tuple extraction.

FIG. 6 schematically illustrates another process where, similarly to FIGS. 2-4, a query twig 602 and XML document tree 604 are indicated. Again, the process involved in FIG. 6 may be run on essentially any suitable computer system, such as that indicated at 100 in FIG. 1. The conventional problem that may be appreciated here is that of duplicate tuple production. Particularly, inasmuch as query twig 602 seeks "a" nodes with any ancestor-descendant relationship with both a "b" node and a "c" node, conventional processes will yield the tuple <b1, c1> twice, as that satisfies the query for both nodes a1 and a2. Again, conventional processes will present the inefficiency of over-producing results which then have to be scaled back retroactively.

In contrast, embodiments of the invention provide for the elimination of duplicate tuples "on the fly", right amidst the processing of an incoming XML document stream.

The disclosure now continues with reference to processes broadly contemplated in accordance with embodiments of the invention, described and illustrated non-restrictively with respect to FIGS. 7-14b. Again, the processes involved in FIGS. 7-14b may be run on essentially any suitable computer system, such as that indicated at 100 in FIG. 1.

Figure 7:
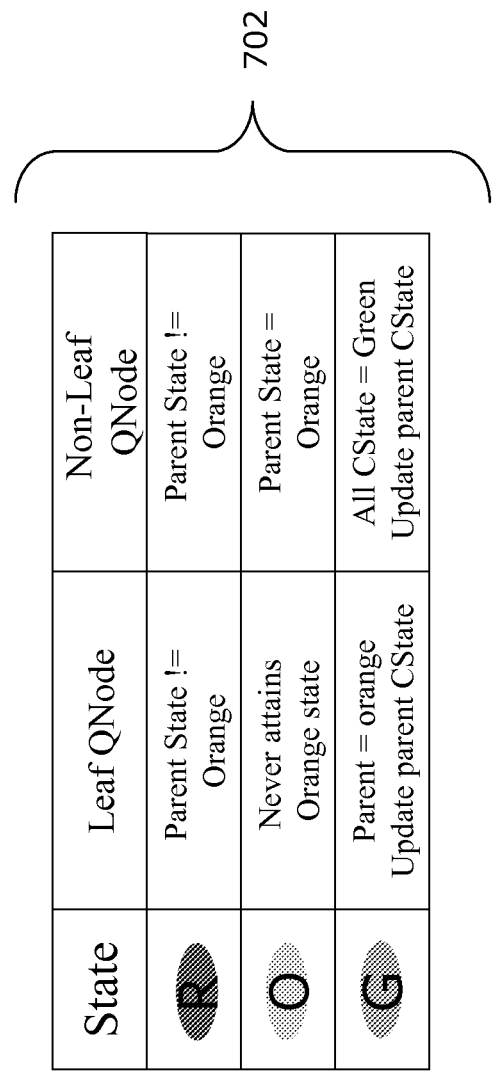
FIG. 7 provides parameters of an algorithm for processing an XML document stream.
Figure 8:
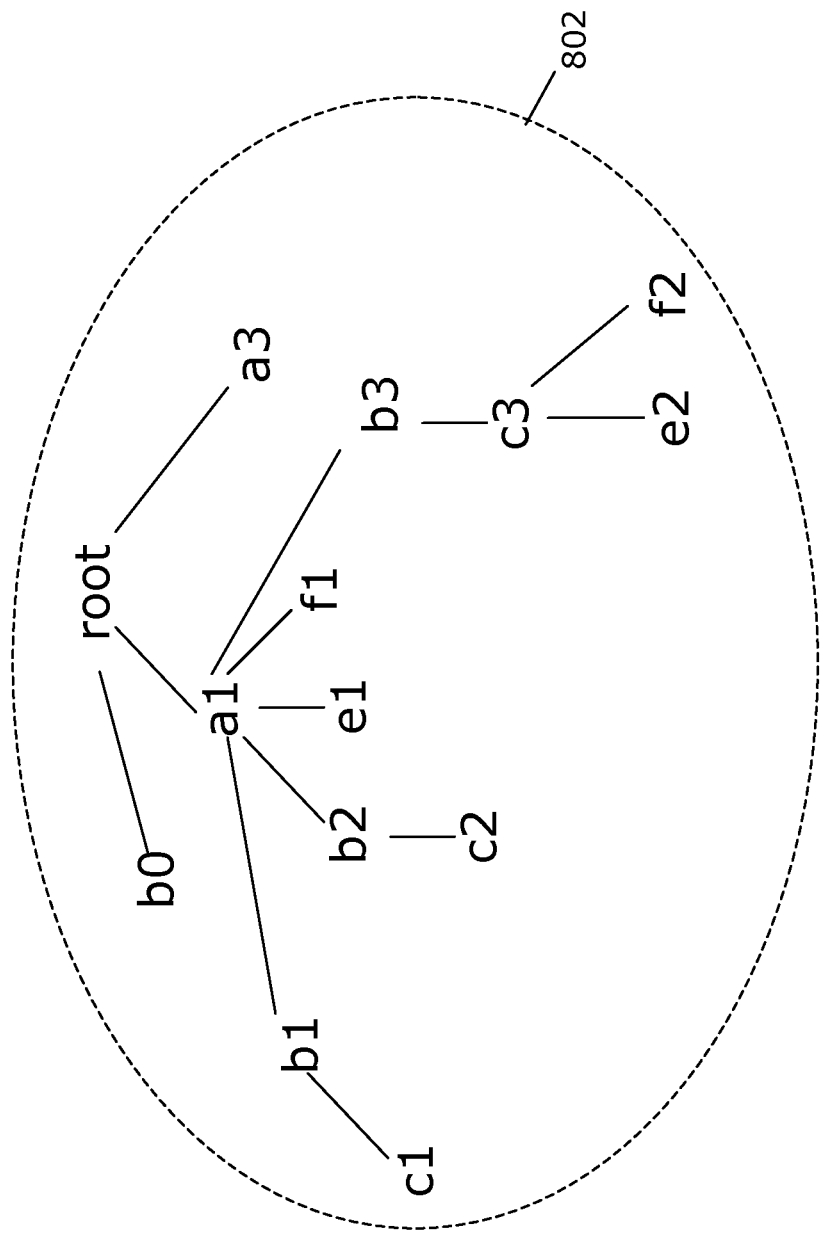
FIG. 8 schematically illustrates an XML document for a sample algorithm run.

FIG. 7 schematically illustrates, at 702, parameters of an algorithm that may be employed in accordance with embodiments of the invention. Reference may also be made to FIG. 8, which schematically illustrates a sample XML document 802 for the purposes of discussion.

Consider a query twig with nodes (e.g., in the manner of query twigs described and illustrated with respect to FIGS. 2-4 and 6). Every node in the query twig, or every "Qnode", may have three possible states, which may be indicated as red, orange and green ("R", "O" and "G" in the drawing). Preferably, each Qnode will start in the red state. If a Qnode of a "root" type is detected in an incoming XML, then its state will preferably transform to orange. (A root node, as shown in FIG. 8, may be considered to be an "ultimate" ancestor node in a document stream 802, that is, a node that only has descendant or child nodes related thereto, and itself has no ancestor or parent nodes related to itself.) Otherwise, every visited Qnode preferably follows the table of FIG. 7. A "leaf Qnode" is one that has no child nodes, while a "non-leaf Qnode" is one that does have one or more child nodes. Preferably, and as will further be built upon herebelow, every non-leaf Qnode will also have associated therewith "CSTATE" & "CPAIRS" data structures. While CPAIRS preferably stores index information on any child nodes of the non-leaf Qnode in question, CSTATE will store the state of each such child node.

Generally, it will be appreciated that FIG. 7, in accordance with an illustrative and non-restrictive example according to an embodiment of the invention, sets forth rules that can govern changes of state among nodes when the state tag of a node is encountered. Generally, the table 702 may be understood in that when the start tag (to be defined further below) of a given type of Qnode (leaf Qnode or non-leaf Qnode, at the head of each column) is encountered, that Qnode will remain in a given state (at the left of each row) for as long as the noted condition is satisfied. Thus, for instance, "red" state entries for both leaf and non-leaf Qnodes have the significance here that, when the start tag of a leaf Qnode (or non-leaf Qnode, respectively, is encountered, the Qnode will remain in "red" state for as long as its parent is not in "orange" state (wherein "!"="not in"). By way of another example, when the state of a non-leaf Qnode will change to green if all the entries in the Qnode's CSTATE are green. (Of course, if such a condition is satisfied, then preferably parent CSTATEs will also be updated.) By way of brief explanation with relation to embodiments discussed herein, each node in an XML document may be considered to have a start tag and en tag, which appear when the node is encountered during XML document streaming.

Reviewing now a sample algorithm run in accordance with an embodiment of the invention, with continued reference to the sample XML document 802 in FIG. 8. Reference may also now be made to FIG. 9a, which shows a query twig 902 to be applied to document 802, and FIG. 9b, which shows a representation 904 of the states of Qnodes as can be understood in accordance with an embodiment of the present invention, and particularly at an initial state. Further, FIG. 10a illustrates a representation 1002 of an evolved state of Qnodes in the present example, while FIG. 10b shows a table of CPAIRS 1008.

Figure 9B:
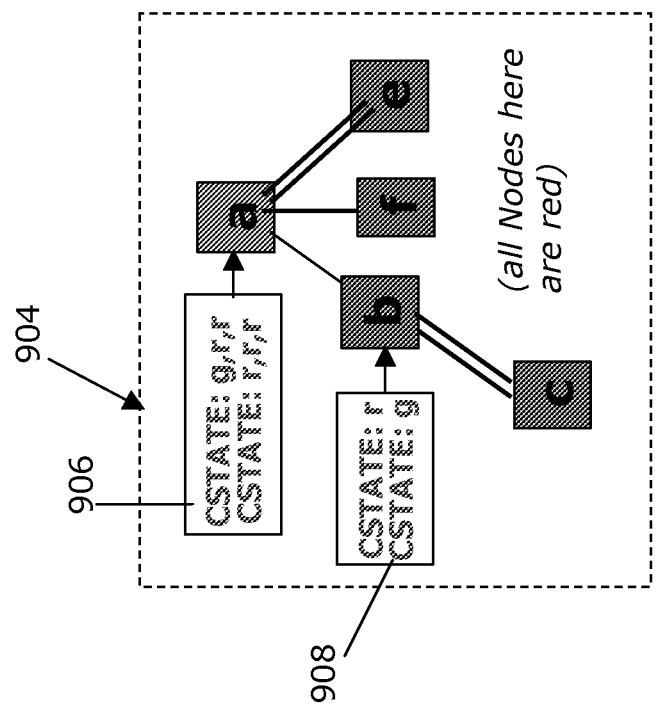
FIG. 9b schematically illustrates a Qnode tree, in a first state, for the sample algorithm run.
Figure 9A:
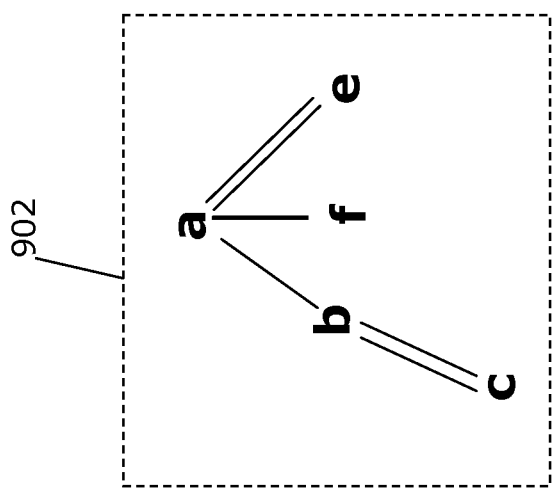
FIG. 9a schematically illustrates a query twig for the sample algorithm run.

Proceeding with the sample algorithm run, upon initial arrival of 'b0', no change takes place since its 'a' parent is still red (inasmuch as all Qnodes start out as "red" as shown in FIG. 9b). When 'a1' arrives, however, the 'a' Qnode will become orange. Thence, when 'b1' arrives, since its 'a' parent is orange then the 'b' Qnode also now will become orange. Thence, when 'c1' arrives, the 'c' Qnode becomes green & so does the 'b' Qnode. The evolved state 1002 of the Qnodes at this point can be seen in FIG. 10a, whereas the CPAIRS created by the process are indicated at 1008 in FIG. 10b.

CSTATES are also laid out in FIGS. 9b and 10a. In FIG. 9b, CSTATES of Qnode "a" are indicated at 906 and those of Qnode "b" are indicated at 908. Further, an evolution in CSTATES is shown within the boxes 906/908. Thus, referring to "a" CSTATES 906, it will be appreciated that Qnode "a" has three child Qnodes b/f/e. Accordingly, at one stage, the CSTATES 906 shown here are green/red/red for b/f/e respectively, thence evolving to red/red/red. On the other hand, Qnode "b" only has one child Qnode, namely, "c". Thus, the CSTATES 908 shown here are red at one stage, thence evolving to green with respect to Qnode "c". These CSTATES 906/908 are preferably stored at or in association with each Qnode in question (here, "a" and "b"). The different and evolving sets of CSTATES in each box 906/908 can be understood to represent those particular sets of CSTATES that are possible in the context of the streaming XML document 802 of FIG. 8 and, for instance, will evolve or change responsive to the encountering of particular nodes in document 802, following the logic of the table 702 set forth in FIG. 7. The same holds true for the CSTATES 1004/1006 of FIG. 10.

In FIG. 10a, CSTATES of Qnode "a" are indicated at 1004 and those of Qnode "b" are indicated at 908. Further, an evolution in CSTATES is shown within the boxes 906/908. Thus, referring to "a" CSTATES 906, it will be appreciated that Qnode "a" has three child Qnodes b/f/e. Accordingly, at one stage, the CSTATES 906 shown here are green/red/red for b/f/e respectively, thence evolving to red/red/red. On the other hand, Qnode "b" only has one child Qnode, namely, "c". Thus, the CSTATES 908 shown here are red at one stage, thence evolving to green with respect to Qnode "c". These CSTATES 906/908 are preferably stored at or in association with each Qnode in question (here, "a" and "b").

With continued reference to FIGS. 10a/b, and by way of further elaboration on the sample algorithm run under discussion, when the end-tag of 'c1' arrives, the 'c' Qnode is made red again. When the end-tag of 'b1' arrives, the 'b' Qnode is made red again and its CPAIRs updated as [1]. When the start tag of "b2" then arrives, then Qnode "b" is made orange again. Upon the arrival of "c2", the "c" Qnode and 'b' Qnode are made green again. Thence, upon closure of "c2" and 'b2', the CPAIR of "b" becomes [(1),(1)].

Next, when the start-tag of "e1" arrives, the "e" Qnode becomes green and the CSTATE of Qnode "a" (1004) becomes {g,r,g}. Thence, the start-tag of "f1" makes the "f" Qnode green and the "a" CSTATE (1004) becomes {g,g,g}. Hence, "a" becomes green at that point and, as the root node becomes green, the solutions of {e1,f1,c1}, {e1,f1,c2} are output.

Thence, as the start-tag of "c3" arrives, the "c" Qnode (which happens to be a leaf-Qnode) becomes green and so will its parent "b" Qnode. Now as root to when the same Qnode is green, the solution {c3,e1,f1} is output. In other words, when node "c3" is encountered, the CSTATE of Qnode "a" is "g,g,g", and this then prompts the generation of a tuple, which will happen to be {c3,e1,f1}.

Figure 11:
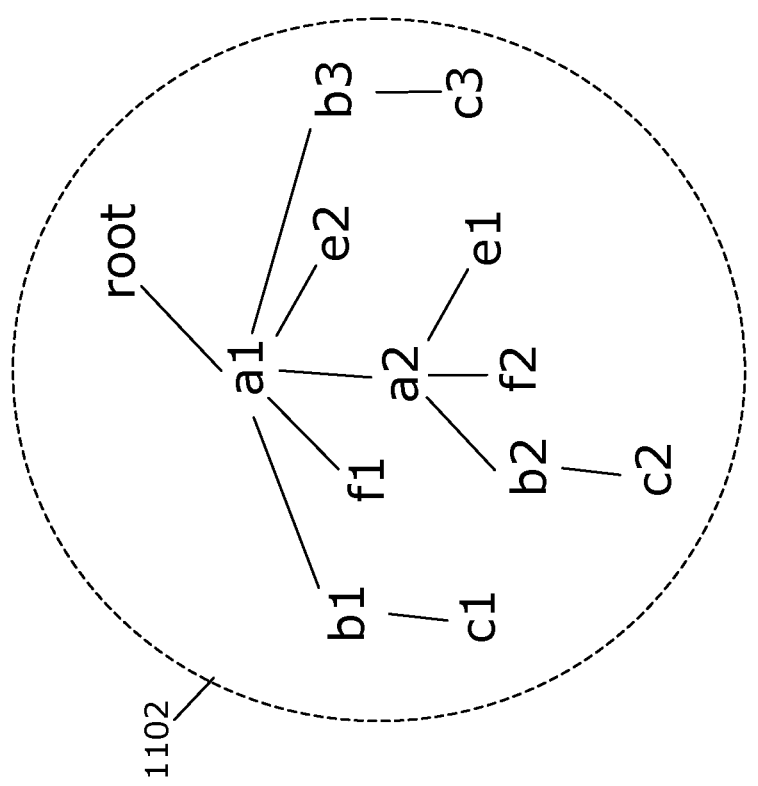
FIG. 11 schematically illustrates an XML document for a second sample algorithm run.
Figure 12B:
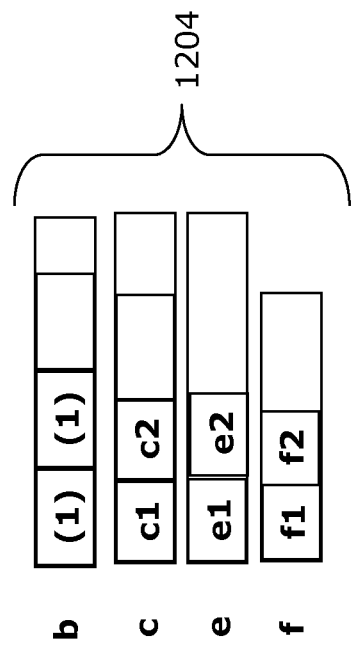
FIG. 12b schematically illustrates a table of CPAIRS.
Figure 12A:
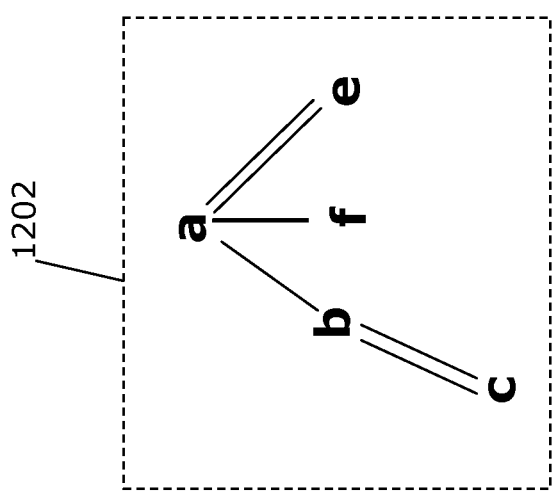
FIG. 12a schematically illustrates a query twig.
Figure 13:
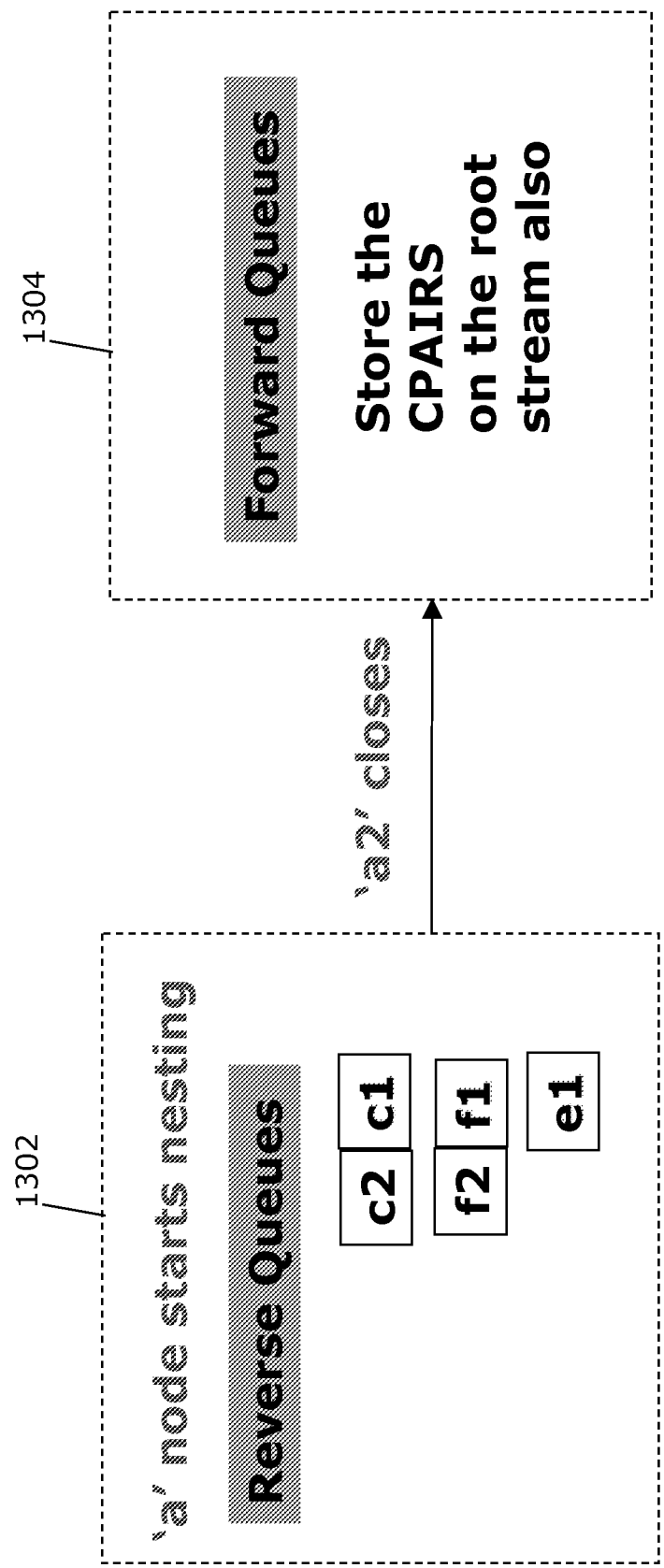
FIG. 13 schematically illustrates steps of a process run, according to an embodiment, by way of illustrating resolution of a nesting problem.
Figure 14A:
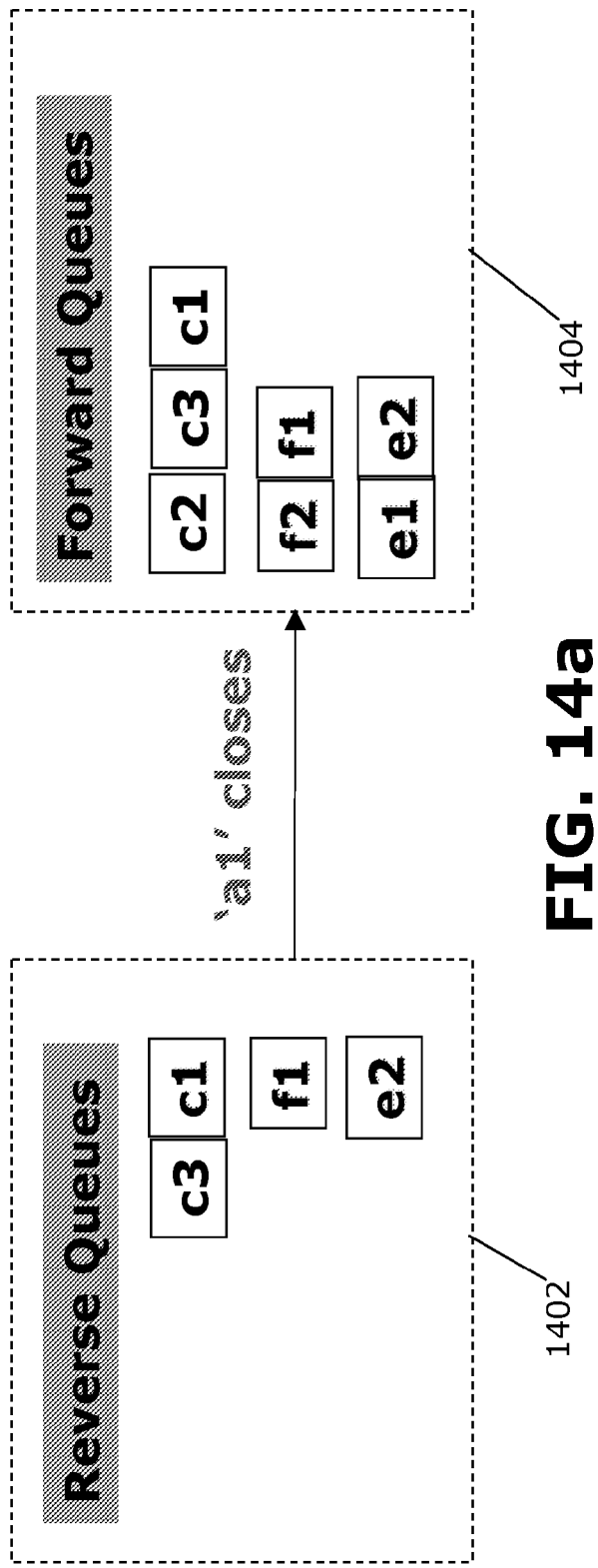
FIG. 14a schematically illustrates additional steps of a process run according to an embodiment, by way of illustrating resolution of a nesting problem.
Figure 14B:
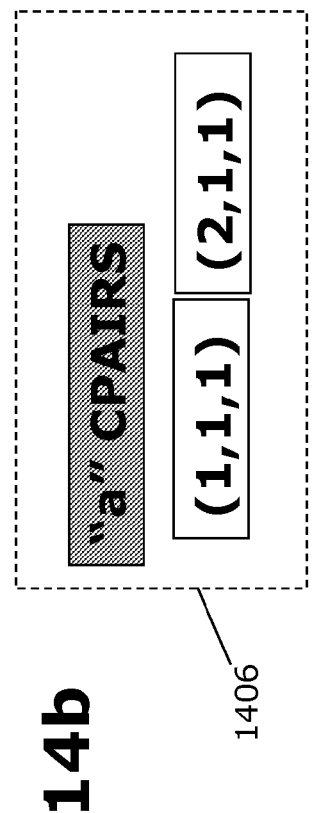

FIGS. 11-14b relate to a nesting problem and their resolution in accordance with embodiments of the invention. As such, FIG. 11 schematically illustrates an XML document tree 1102 provided by way of non-restrictive example, FIG. 12 schematically illustrates a query twig 1202, and FIG. 12b schematically illustrates a table 1204 of CPAIRs. FIGS. 13 and 14a show a sample run by way of an algorithm according to an embodiment of the invention. Finally, FIG. 14b shows resultant CPAIRS for a given Qnode. Reference may continue to be made to all of FIGS. 11-14b as needed.

In a conventional approach, when node "e1" arrives, a solution is produced as (c1,f1,e1), (c2,f2,e1). When "e2" then arrives, an additional solution of (c2,f2,e2) is produced. Accordingly, the aggregate solution becomes (c1,f1,e2), (c1, f2,e2) (c2,f2,e2). However, this solution is incorrect as "c2" appears after "c1", while "a1" will contain no information about the location of its child node c1 in the stream. More to the point, when "e2" is encountered, CPAIRs are consulted to determine what tuples are to be generated. However, in this case, there is no information in CPAIRs about the fact that "c1" and "c2" are under different "a" nodes. Accordingly, a nesting problem occurs inasmuch as there is a single forward queue, which merely stores data in the order received.

In accordance with an embodiment of the present invention, a technique is applied wherein a "reverse" stream is run for all descendants of "nesting nodes". A "nesting node" may be defined as a Qnode wherein one node of a given type is any descendent of a node of the same type. Hence, in FIG. 11, "a2" is a child of "a1", meaning that Qnode "a" will be a nesting node. As such, CPAIRS of the nesting nodes will preferably continuously update for all children of such nodes. Once nesting occurs, all descendants of the nesting node are stored on the reverse stream.

Thus, as shown in FIG. 13, when the "a" Qnode (starts nesting (1302), all descendants thereof are stored on the reverse stream and "a2" closes. In forward queues (1304), CPAIRs of "a" are stored on the root stream. Turning to FIG. 14a, when "e2" and "c3" appear they appear in the reverse stream with their counterparts (1402), then "a1" closes (1404). By way of further elaboration, when "a2" is encountered below "a1", all information in the queues at that point in time is moved to the "forward" queue. When "a2" is encountered, the queues will be as follows: b: (1); c: c1; f: f1; while e will be empty. All of these values will then be moved to the forward queue. When "a2" closes (i.e., its end tag is encountered), all the values which are below "a2" will be moved to the reverse queue; thus, at that point, the queues will be as follows: b: (1), (1); c: c1, c2; f: f1, f2; e: e1. Accordingly, the last (1) will be moved from b to the reverse queue, along with c2, f2 and e1.

Generally, in a preferred embodiment of the present invention, ancestor-descendant (AD) and parent-child (PC) relationships are handled differently for nesting nodes. Particularly, if a nesting node has all child AD-AD then no change need be made to the algorithm at hand. If the nesting node has PC-PC relationships, then preferably the reverse queuing technique is used. If the nesting node has AD-PC relationships, a reverse queuing algorithm is preferably used and also it is determined as to where the nesting starts. For non-leaf nodes with single children, CPAIRS are not needed.

In brief recapitulation, it will be appreciated that, in accordance with embodiments of the invention, an event-based process is broadly contemplated that is tailored particularly well for streaming XML data. As opposed to a "lazy" shredding scheme, embodiments of the invention can involve an "optimistic lazy" scheme. By way of a significant advantage, embodiments of the invention optimize a shredding or tuple extraction protocol responsive to any parent-child or ancestor-descendant node relationships in streaming XML data.

Conventional efforts fall short in that results are buffered in memory a complete tuple appears in the tuple extraction process. Intermediate results are generated which are then merged to generate final tuples, without optimizing for the set of parent-child or ancestor-descendant node relationships at hand. By contrast, there are broadly contemplated, in accordance with embodiments of the invention, processes in which intermediate results do not need to be stored in memory; tuple results, instead, are attainable in a single pass without the need for any retroactive pruning (of excess or duplicate results).

It should be noted as well that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   one or more processors; and
   a computer readable storage medium having computer readable program code embodied therewith and executable by the one or more processors, the computer readable program code comprising:
   computer readable program code configured to accept an XML document stream;
   computer readable program code configured to apply a query twig to the XML document stream;
   computer readable program code configured to extract tuples from the XML document stream based on the query twig and, during streaming of the XML document stream, proactively limit a quantity of extracted tuples via foregoing:
   extraction of duplicate tuples; and
   extraction of tuples that do not satisfy query twig criteria; and
   computer readable program code configured to store, at a non-leaf node in the query twig, information about a child node, and to employ the information in the limiting a quantity of extracted tuples, wherein the information includes state information about the child node, the state information conveying information that relates to at least one node in the XML document stream;
   said computer readable program code being configured to pre-compute partial results during streaming of an XML document, wherein the XML document stream used to pre-compute partial results is not buffered towards computing a final result;

said computer readable program code being configured to accept the XML document stream of a size that exceeds available memory.

2. The apparatus according to claim 1, wherein said computer readable program code is configured to apply a query twig which includes a parent-child edge and an ancestor-descendant edge.

3. The apparatus according to claim 1, wherein said computer readable program code is configured to accept an XML document stream portion of a size that exceeds available memory and which portion requires processing before a tuple is extracted.

4. The apparatus according to claim 1, wherein said computer readable program code is configured to assign and track distinct states of nodes in the query twig to ascertain when a final result can be computed.

5. The apparatus according to claim 4, wherein said computer readable program code is configured to assign three distinct states to nodes in the query twig.

6. The apparatus according to claim 1, wherein said computer readable program code is configured to store, at a non-leaf node in the query twig, state information about a child node.

7. The apparatus according to claim 1, wherein said computer readable program code is configured to store, at a non-leaf node in the query twig, index information about a child node.

8. The apparatus according to claim 1, wherein said computer readable program code is configured to:
  accommodate a nesting node from an XML document stream; and
  apply a reverse stream to a descendant of a nesting node.

9. The apparatus according to claim 1, wherein said computer readable program code is configured to:
  store, at a non-leaf node in the query twig, index information about a child node; and
  continuously update index information about a child node of a nesting node.

10. A method comprising:
  accepting an XML document stream;
  applying a query twig to the XML document stream;
  extracting tuples from the XML document stream based on the query twig and, during streaming of the XML document stream, proactively limiting a quantity of extracted tuples via foregoing:
    extraction of duplicate tuples; and
    extraction of tuples that do not satisfy query twig criteria;
  storing, at a non-leaf node in the query twig, information about a child node, and employing the information in the limiting a quantity of extracted tuples, wherein the information includes state information about the child node, the state information conveying information that relates at least one node in the XML document stream; and
  pre-computing partial results during streaming of an XML document, wherein the XML document stream used to pre-compute partial results is not buffered towards computing a final result;
  wherein said accepting comprises accepting the XML document stream of a size that exceeds available memory.

11. The method according to claim 10, wherein said applying of a query twig comprises applying a query twig which includes a parent-child edge and an ancestor-descendant edge.

12. The method according to claim 10, wherein said accepting comprises accepting an XML document stream portion of a size that exceeds available memory and which portion requires processing before a tuple is extracted.

13. The method according to claim 10, further comprising assigning and tracking distinct states of nodes in the query twig to ascertain when a final result can be computed.

14. The method according to claim 13, wherein said applying comprises assigning three distinct states to nodes in the query twig.

15. The method according to claim 10, wherein said storing comprises storing, at a non-leaf node in the query twig, state information about a child node.

16. The method according to claim 10, wherein said storing comprises storing, at a non-leaf node in the query twig, index information about a child node.

17. The method according to claim 10, wherein said extracting comprises:
  accommodating a nesting node from an XML document stream; and
  applying a reverse stream to a descendant of a nesting node.

18. The method according to claim 10, further comprising:
  storing, at a non-leaf node in the query twig, index information about a child node; and
  continuously updating index information about a child node of a nesting node.

19. A computer program product comprising:
  a non-transitory computer readable storage medium having computer readable program code embodied therewith, the computer readable program code comprising:
  computer readable program code configured to accept an XML document stream;
  computer readable program code configured to apply a query twig to the XML document stream;
  computer readable program code configured to extract tuples from the XML document stream based on the query twig and, during streaming of the XML document stream, proactively limit a quantity of extracted tuples via foregoing:
    extraction of duplicate tuples; and
    extraction of tuples that do not satisfy query twig criteria; and
  computer readable program code configured to store, at a non-leaf node in the query twig, information about a child node, and to employ the information in the limiting a quantity of extracted tuples, wherein the information includes state information about the child node, the state information conveying information that relates to at least one node in the XML document stream;
  said computer readable program code being configured to pre-compute partial results during streaming of an XML document, wherein the XML document stream used to pre-compute partial results is not buffered towards computing a final result;
  said computer readable program code being configured to accept the XML document stream of a size that exceeds available memory.

* * * * *